(12) United States Patent
Kim et al.

(10) Patent No.: US 8,137,591 B2
(45) Date of Patent: Mar. 20, 2012

(54) CATALYST FOR PREPARING CARBON NANOTUBE COMPRISING MULTI-COMPONENT SUPPORT MATERIALS CONTAINING AMORPHOUS SILICON PARTICLES AND THE BULK SCALE PREPARATION OF CARBON NANOTUBE USING THE SAME

(75) Inventors: Dong Hwan Kim, Daejeon (KR); Sang-Hyo Ryu, Daejeon (KR); Wan Sung Lee, Daejeon (KR); Namsun Choi, Daejeon (KR); Hyun-Kyung Sung, Daejeon (KR); Youngchan Jang, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 374 days.

(21) Appl. No.: 12/568,884

(22) Filed: Sep. 29, 2009

(65) Prior Publication Data

US 2010/0230642 A1    Sep. 16, 2010

(30) Foreign Application Priority Data

Mar. 13, 2009    (KR) .................. 10-2009-0021461

(51) Int. Cl.
*H01B 1/04* (2006.01)
(52) U.S. Cl. .......... 252/502; 252/71; 252/510; 252/511; 252/512; 423/447.1; 423/447.3; 423/447.5; 428/402; 502/208; 502/209; 502/241; 502/252; 502/327; 562/512.2; 562/548; 562/549
(58) Field of Classification Search ............ 252/71, 252/502, 510–512; 423/447.1, 447.3, 447.5; 428/402; 502/208, 209, 241, 252, 327; 562/512.2, 562/548, 549
See application file for complete search history.

(56) References Cited

U.S. PATENT DOCUMENTS 7,468,342 B2 * 12/2008 Kanamori et al. ............ 502/327
2005/0074392 A1 * 4/2005 Yang et al. .................. 423/447.3
* cited by examiner

*Primary Examiner* — Khanh Tuan Nguyen
(74) *Attorney, Agent, or Firm* — Kenyon & Kenyon LLP

(57) ABSTRACT

The present invention relates to a catalyst composition for preparing carbon nanotube containing multi-component support materials of amorphous Si, Mg and Al as well as a bulk scale preparation process for preparing carbon nanotube using said catalyst composition. More specifically, this invention relates to a process for preparing carbon nanotube using the catalyst composition comprising a transition metal catalyst and support materials of amorphous Si, Mg and Al.

5 Claims, 4 Drawing Sheets

CATALYST FOR PREPARING CARBON NANOTUBE COMPRISING MULTI-COMPONENT SUPPORT MATERIALS CONTAINING AMORPHOUS SILICON PARTICLES AND THE BULK SCALE PREPARATION OF CARBON NANOTUBE USING THE SAME

BACKGROUND OF THE INVENTION

1. Field of the Invention

The present invention relates to a catalyst composition for preparing carbon nanotube containing multi-component support materials of amorphous Si, Mg and Al as well as a bulk scale preparation process for preparing carbon nanotube using said catalyst composition. More specifically, this invention relates to a process for preparing carbon nanotube using the catalyst composition comprising a transition metal catalyst and support materials of amorphous Si, Mg and Al. Further, the present invention also provides a bulk scale preparation method for preparing carbon nanotube having the following characteristics: the diameter of carbon nanotube is 5~20 nm; the number of wall is less than 15; the apparent density of carbon nanotube is 0.03~0.08 g/cc; and the carbon conversion yield is in the range of 40~80%.

2. Description of Prior Art

Carbon nanotube was firstly disclosed by Dr. Iijima in Nippon Electric Company (NEC) by arc discharging the carbon rod containing metal catalyst (S. Iijima, Nature, 354, 56 (1991)). The further studies of carbon nanotube disclosed that carbon nanotube shows diverse and advantageous physical and chemical properties. The technical developments in controlling the structure of carbon nanotube let it be applied to various fields of industries, such as, reinforcing agent of polymer, pharmaceuticals, storage of energy, catalyst support for polymer synthesis.

A research group of Baker and N. M. Rodriguez in the United States has specifically developed the crystalline structure of carbon nano materials (J. Mater. Res., Vol 8: 3233~3250, 1993). As preparation methods of carbon nanotube, an arc discharge method, a laser ablation method, a catalytic growing method and a plasma method have been described in following documents: that are, R. E. Smalley et al., J. Phs. Chem., 243, 49 (1995); M. Endo et al., Carbon, 33, 873 (1995); U.S. Pat. No. 5,424,054; Chem. Phys. Lett., 243, 1-12 (1995); Science, 273: 483-487 (1996); and U.S. Pat. No. 6,210,800.

For a commercial use of carbon nanotube, it is very important to produce high quality of carbon nanotube in a low cost. It has been known that structural control of diameter or length of carbon nano material can be accomplished by understanding of transition metal, catalyst support materials and interaction between transition metal and catalyst support materials.

In PCT International publication No. WO 2006/50903 'Catalyst for producing carbon nanotubes by means of the decomposition of gaseous carbon compounds on a heterogeneous catalyst', it has been disclosed that the transition metal catalyst composition comprising Mn, Co, optionally Mo and a support material enables to produce carbon nanotube having 3~150 nm of diameter in a high catalytic yield. However, there is no specific description about the role of catalyst support materials.

In Korean Early Patent Publication No. 10-2004-82950 'Synthetic method of large amount of double walled carbon nanotube by chemical vapor deposition method', the single walled or double walled carbon nanotube prepared by a catalyst complex has been disclosed. In this disclosure, the catalyst complex has been prepared by inserting the transition metals, such as, Fe, Co, Ni, Mo or alloy of them into the nano scale pore in support materials consisting of MgO, alumina, zeolite or silica. However, such techniques definitely have their limitation to the commercialization because it is difficult to prepare 2~5 nm of nano-sized Fe, Co, Ni and/or Mo transition metals as catalyst metal particles in bulk.

In Korean Early Patent Publication No. 10-2006-18472 'Process for preparing carbon nanotube using the mechano-chemical treated catalyst', carbon nano fiber prepared by a chemical vapor deposition method using acetylene as a carbon source in the presence of mechano-chemical treated support catalyst comprising Ni and Mg support has been disclosed. However, Mg support had been already disclosed before this invention. Further, there is no specific description regarding the function of support materials.

In Korean Early Patent Publication No. 10-2005-78596 'Purification method of carbon nanotube and preparation method of carbon nanotube', carbon nanotube prepared by a plasma chemical vapor deposition method has been disclosed. Further, in this preparation method, the plasma chemical vapor deposition method comprises i) substrate preparation step for growing carbon nanotube; ii) growing step for carbon nanotube on the said substrate; and iii) purification step of carbon nanotube using plasma of inert gas has been disclosed. As a catalyst composition, the mixed metal composition of Ni, Fe and Co has been disclosed. However, the transition metal as well as support material used in this disclosure has been already disclosed. Further, there is no description about the advantageous effect of catalyst in itself and support materials.

The preparation method for the synthesis of carbon nanotube disclosed in various technical documents or patents can be specified by the kind and ratio of transition metals and the shape and size of support materials included in catalyst composition. Regarding the preparation of catalyst composition, it has been described in following documents. P. E. Anderson et al., J. Mater. Res., 14(7), 2912 (1999); and R. J. Best, W. W. Russell, J. Am. Chem. Soc., 76, 838 (1974). Nonetheless, it is still required to develop a catalyst composition to enhance the catalytic productivity as well as to realize structural characteristics of carbon nanotube by controlling the numerous variables regarding catalyst synthesis.

Only a few documents disclosed the characteristics of catalyst suitable for the continuous process for the synthesis of carbon nanotube, while most of them disclosed the characteristics of catalyst suitable for the batch process for the synthesis of carbon nanotube.

Transition metal and support material in the catalyst composition exist in the form of multi-oxide complex due to the heat treatment of them over 600° C. under atmosphere. During this heat treatment step, the catalyst particles become to be grown. It has been known that the size of catalyst particles plays an important role in determining the diameter of carbon nanotube.

Ultimately, it is important to obtain the homogeneity of a catalyst composition under the precise heat treatment conditions in order to produce a catalyst composition in a bulk scale. According to thermal chemical deposition method, the form of metal oxide or metal hydroxide of Mg, Al and Si has been used as catalyst support materials. In case of silicon, high crystalline type of $SiO_2$ has been used in a thermal chemical deposition method.

In the course of researching the catalyst composition for preparing carbon nanotube, the inventors of present invention found that the binding property of the transition metal with the support material and the control of particle size of a catalyst composition are detrimentally affected by the heat treatment step performed at high temperature under atmosphere when using a crystalline material as a support.

According to the conventional method for preparing a catalyst composition, the heat treatment step performed over 600° C. under atmosphere as well as the additional heat treatment for reducing the catalyst composition to enhance its activity has been required before the main decomposition reaction of the hydrocarbon on the catalyst particle. In view of a carbon nanotube manufacturer, it is desirable that the number of heat treatment steps is reduced and the hydrocarbon having low decomposition temperature such as ethylene is used as a carbon source for preparing carbon nanotube having less than 20 nm of diameter. However, it is still required to develop a catalyst composition which provides a high productivity and catalytic activity. Further, the high preparation cost of carbon nanotube prohibits the carbon nanotube from being commercially available in a bulk scale.

To overcome the above mentioned problems, the inventors of present invention have developed a catalyst composition for preparing carbon nanotube. We found that the carbon nanotube having less than 20 nm of diameter can be prepared without an additional heat treatment for the reduction of a catalyst composition before the decomposition reaction of hydrocarbon when amorphous silicon is used as a metal support material in a catalyst composition. It is further found that the productivity of carbon nanotube is also enhanced by selectively using other support materials together with amorphous silicon.

Finally, we have developed a catalyst composition which has consistent homogeneity between the transition metal particle and the support material by introducing an amorphous type of support material. We have further developed a preparation method for carbon nanotube, wherein the control of size of diameter, the control of the number of wall and length of carbon nanotube are accomplished by using the developed catalyst composition. In addition, a high catalytic yield is obtained even without using hydrogen gas as a reducing agent at the time of catalytic reaction of hydrocarbon. Ultimately, we have developed a preparation method for carbon nanotube having the following characteristics: the diameter of carbon nanotube is 5~20 nm; the number of wall is less than 15; the apparent density of carbon nanotube is 0.03~0.08 g/cc; and the carbon conversion yield is in the range of 40~80%.

SUMMARY OF THE INVENTION

The object of present invention is to provide a catalyst composition containing an amorphous silicon support material for preparing carbon nanotube represented by following formula

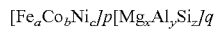
$[Fe_aCo_bNi_c]p[Mg_xAl_ySi_z]q$ wherein

[Fe, Co, Ni] represents catalyst metal of iron, cobalt, nickel and its oxide or its derivative;

[Mg, Al, Si] represents inactive support material of magnesium, aluminum, amorphous silicon and its oxide or its derivative;

p and q represent mole fraction of catalyst metal and inactive support material respectively;

$p+q=1$, $0.03 \leq p \leq 0.9$, $0.1 \leq q \leq 0.97$, a, b and c represent mole fraction of Fe, Co and Ni, respectively;

$a+b+c=1$, $0.1 \leq a \leq 1.0$, $0 \leq b \leq 0.9$, $0 \leq c \leq 0.9$, x, y and z represent mole fraction of Mg, Al and amorphous Si, respectively;

$x+y+z=1$, $0.05 \leq x \leq 0.95$, $0.05 \leq y \leq 0.95$, $0.005 \leq z \leq 0.6$.

Further, the mole fractions of catalyst metal and inactive support material are preferably $p+q=1$, $0.1 \leq p \leq 0.7$, $0.3 \leq q \leq 0.9$ respectively; the mole fractions of Fe, Co and Ni are preferably $a+b+c=1$, $0.2 \leq a \leq 0.95$, $0.01 \leq b \leq 0.8$, $0.01 \leq c \leq 0.8$ respectively; the mole fractions of Mg, Al and amorphous Si are preferably $x+y+z=1$, $0.1 \leq x \leq 0.9$, $0.1 \leq y \leq 0.9$, $0.005 \leq z \leq 0.5$ respectively.

The particle size of amorphous silicon is in the range of 50~500 nm.

The further object of the invention is to provide a process for preparing a catalyst composition for carbon nanotube comprising;

i) preparing the amorphous silicon nano powder;
ii) preparing the support material (Si, Mg and Al) solution by mixing Mg, Al salt solution with amorphous silicon nano powder;
iii) preparing the aqueous solution containing catalyst metal and support material of $\{[Fe_aCO_bNi_c]p[Mg_xAl_ySi_z]q\}$ by adding catalyst metal solution to the support material solution prepared in step (ii);
iv) co-precipitating or coordinated precipitating catalyst composition containing the catalyst metal and support material by adding co-precipitating agent solution to the aqueous solution prepared in step (iii);
v) filtering, drying and milling the co-precipitated catalyst composition obtained in step (iv);
vi) heat treating the catalyst composition obtained in step (v) at 400~800° C. under inert gas atmosphere; and
vii) grinding the heat treated catalyst composition in step (vi) in dry condition The co-precipitated agent solution in step (iv) is ammonium bicarbonate solution.

The further object of the invention is to provide a process for preparing carbon nanotube comprising; i) preparing a catalyst composition for the synthesis of carbon nanotube; ii) supplying at least one carbon source selected from saturated or unsaturated hydrocarbon having 1~4 carbon atoms to the reactor at 500~900° C.; and iii) growing and synthesizing carbon nanotube by decomposition of supplied carbon source on the surface of a catalyst composition according to a chemical vapor deposition method.

Said at least one carbon source selected from saturated or unsaturated hydrocarbon having 1~4 carbon atoms in step ii) can be replaced into the mixed gas of hydrogen and at least one carbon source selected from saturated or unsaturated hydrocarbon having 1~4 carbon atoms.

The obtained carbon nanotube has following properties: i) the diameter of carbon nanotube is 5~20 nm; ii) the number of wall is less than 15; iii) the apparent density of carbon nanotube is 0.03~0.08 g/cc; and iv) the carbon conversion yield is in the range of 40~80%.

The further object of invention is to provide a composite of polymer and carbon nanotube by homogeneously dispersing carbon nanotube into polymer, wherein said composite of polymer and carbon nanotube shows excellent electrical and thermal conductivity.

The preferred polymer used in said carbon nanotube polymer complex is at least one selected from modified polyphenylene oxide (MPPO), acrylonitrile-butadiene-styrene copolymer (ABS), polycarbonate (PC), acrylonitrile-butadiene-styrene copolymer/polycarbonate (ABS/PC), polybutylene terephthalate (PBT), polyethylene terephthalate (PET), polyamide (PA), polyphenylene sulfide (PPS) and/or polyetheretherketone (PEEK).

DETAILED DESCRIPTION OF THE INVENTION

Figure 1:
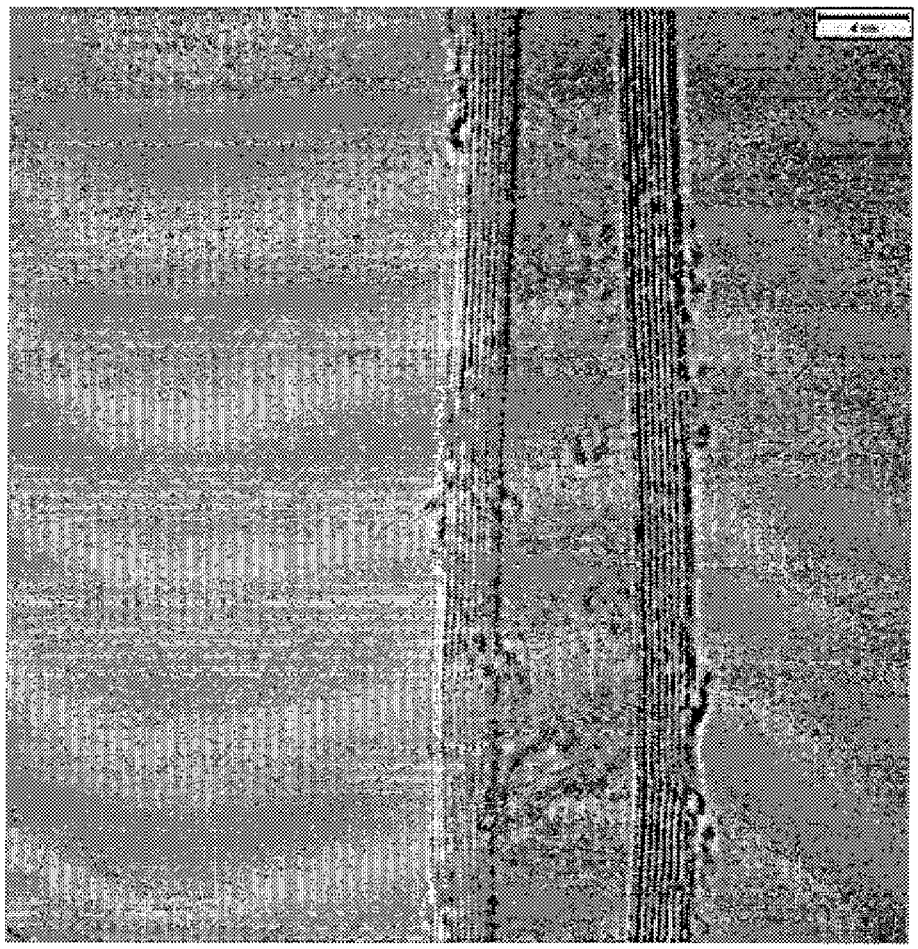
FIG. 1 shows a Transmission Electron Microscopy (TEM) photograph of carbon nanotube prepared in Example 1 of present invention.
Figure 2:
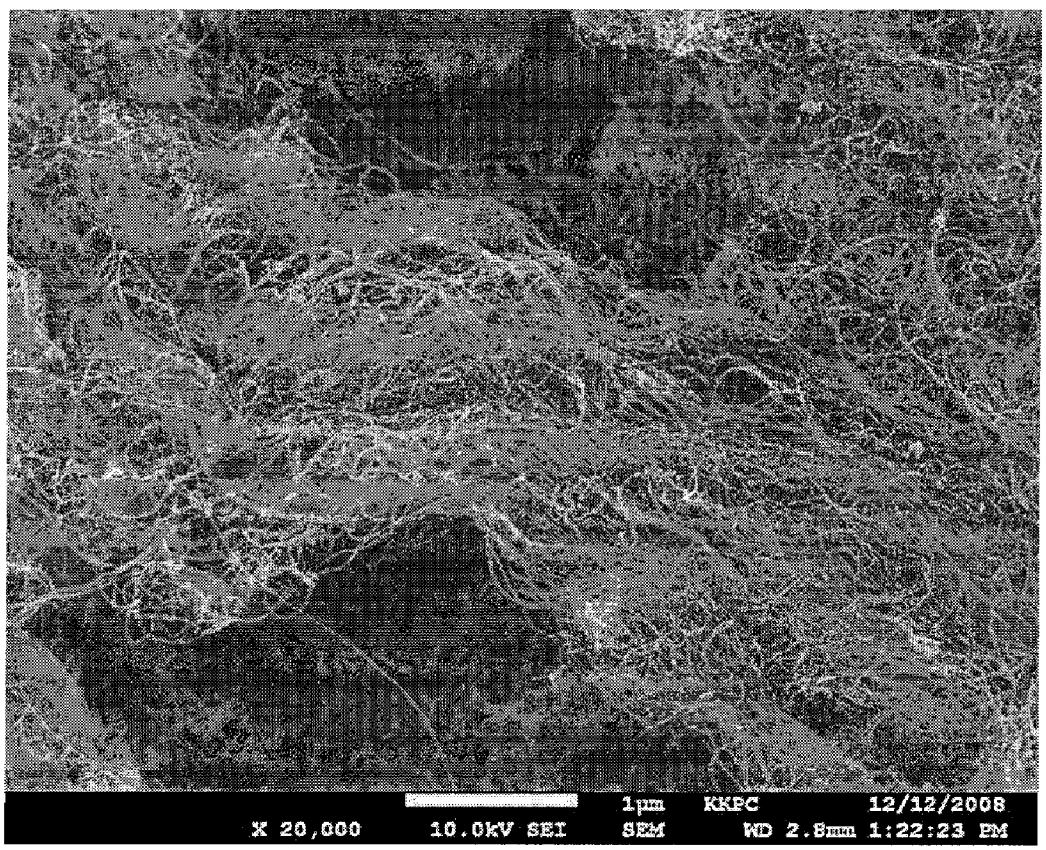
FIG. 2 shows a Field Emission Scanning Electron Microscope (FE-SEM) photograph of carbon nanotube prepared in Example 1 of present invention.

The present invention relates to a catalyst composition containing amorphous silicon support material for preparing carbon nanotube represented by following formula $$[Fe_aCo_bNi_c]p[Mg_xAl_ySi_z]q$$

wherein

[Fe, Co, Ni] represents catalyst metal of iron, cobalt, nickel and its oxide or its derivative;

[Mg, Al, Si] represents inactive support material of magnesium, aluminum, amorphous silicon and its oxide or its derivative;

p and q represent mole fraction of catalyst metal and inactive support material respectively;

p+q=1, $0.03 \leq p \leq 0.9$, $0.1 \leq q \leq 0.97$, a, b and c represent mole fraction of Fe, Co and Ni, respectively;

a+b+c=1, $0.1 \leq a \leq 1.0$, $0 \leq b \leq 0.9$, $0 \leq c \leq 0.9$, x, y and z represent mole fraction of Mg, Al and amorphous Si, respectively;

x+y+z=1, $0.05 \leq x \leq 0.95$, $0.05 \leq y \leq 0.95$, $0.005 \leq z \leq 0.6$.

Further, the present invention also relates to a process for preparing a catalyst composition for carbon nanotube comprising; i) preparing the amorphous silicon nano powder; ii) preparing the support material (Si, Mg and Al) solution by mixing Mg, Al salt solution with amorphous silicon nano-sized particles iii) preparing the aqueous solution containing catalyst metal and support material of {[Fe$_a$CO$_b$Ni$_c$]p[Mg$_x$-Al$_y$Si$_z$]q} by adding catalyst metal solution to the support material solution prepared in step (ii); iv) co-precipitating or coordinated precipitating the catalyst composition containing the catalytic metal and support material by adding co-precipitating agent solution to the aqueous solution prepared in step (iii); v) filtering, drying and milling the co-precipitated catalyst composition obtained in step (iv); vi) heat treating the catalyst composition obtained in step (v) at 400~800° C. under inert gas atmosphere; and vii) grinding the heat treated catalyst composition prepared in step (vi) in dry condition.

The advantageous effect of present application is to provide a carbon nanotube having the following characteristics: the diameter of carbon nanotube is 5~20 nm; the number of wall is less than 15; the apparent density of carbon nanotube is 0.03~0.08 g/cc; and the carbon conversion yield is in the range of 40~80%.

Further, the carbon nanotube obtained by the present application can be applied to electrical conductive plastic container or try for carrying semiconductors, automobile device and/or device for electric home appliances requiring the properties of electrostatic discharge, electromagnetic interference shielding and mechanical high performance in an economical price.

Followings are detailed description of present invention.

The representative preparation methods for amorphous silicon powder are a melting method and a deposition method. However, these methods cannot be applied for preparing amorphous silicon powder in a bulk scale due to their economical drawbacks. In the present invention, amorphous silicon is prepared by applying frictional force the crystalline silicon metal powder with a high energy. It is also observed that the process of the preparation of amorphous silicon is accelerated when using hetero-metal, such as Cu or Ti, or graphite together with crystalline silicon. The suitable amount of hetero-metal or graphite added to crystalline silicon is 0.520 wt % as to the total amount of silicon powder but 0.5~10 wt % is more preferable.

Figure 3:
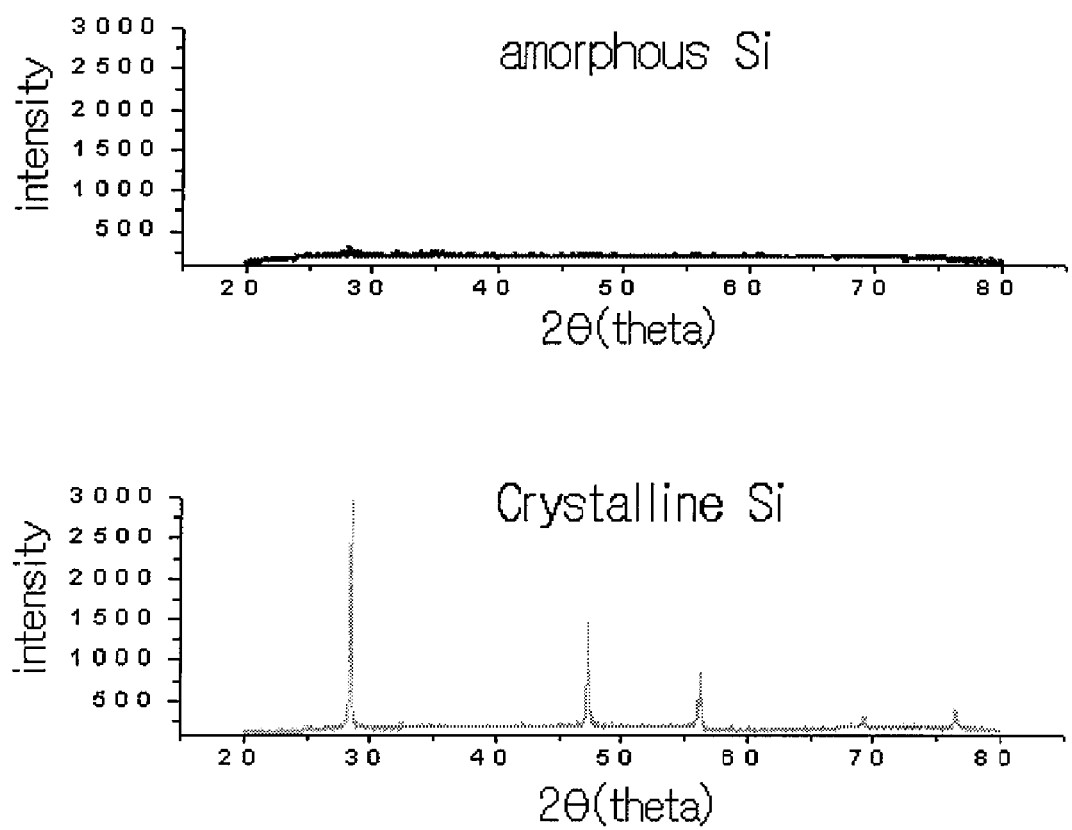
FIG. 3 shows an X-ray diffraction patterns of nano-sized amorphous silicon used in Examples of present invention.
Figure 4:
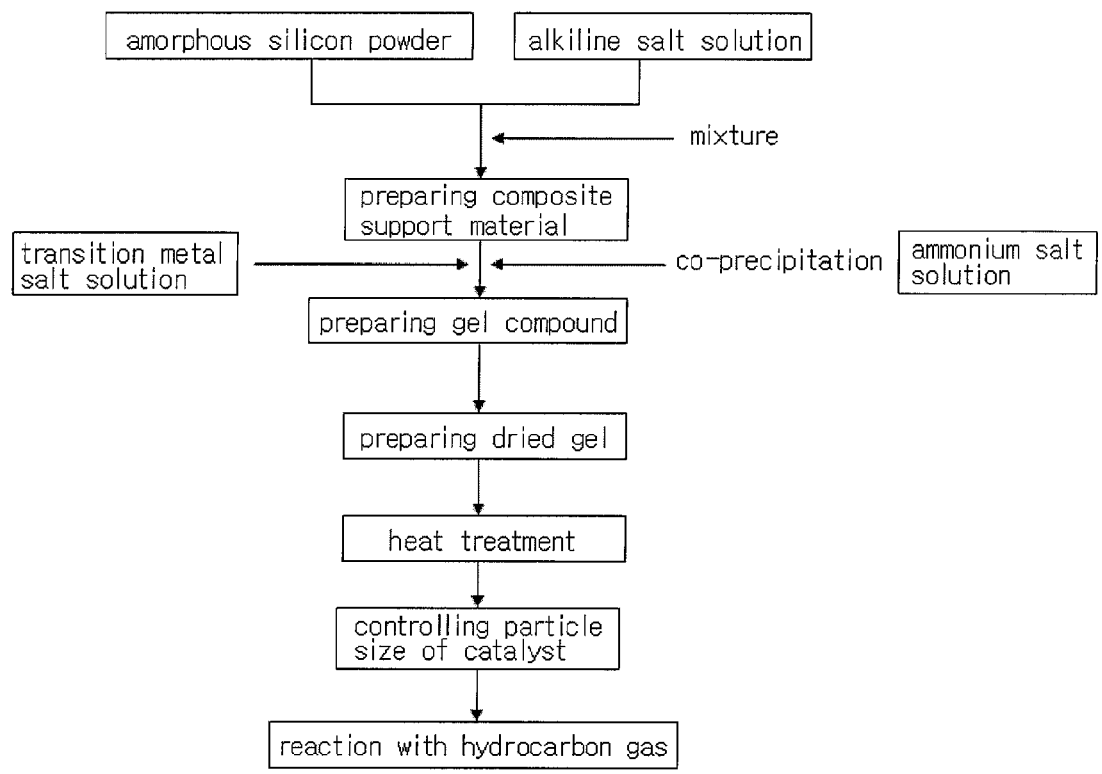
FIG. 4 illustrates a preparation flow chart for catalyst used in Examples of present invention.

Followings are detailed methods for preparing amorphous silicon. The amorphous silicon used in present invention is prepared using a planetary mill at 1,000~3,000 rpm of high rotation using planetary mill. To prepare amorphous silicon having less than 500 nm particle size, preferably less than 300 nm particle size in a purity of more than 90%, preferably more than 98%, crystalline silicon powder is laid on 500 cc of a bowl with 10 mm of stainless-steel balls. The mixture of crystalline silicon powder and stainless-steel balls is rotated at 3,000 rpm of speed under nitrogen atmosphere. The volume ratio between stainless-steel balls and silicon powder is 5~10:1 (v/v), preferably 5~8:1 (v/v). The amorphous degree of silicon is measured by an X-ray diffraction analysis. FIG. 3 shows the X-ray diffraction graph of nano-sized amorphous silicon used in Examples of present invention. The particle size of amorphous silicon is adjusted in the range of 50~500 nm, preferably 50~300 nm.

The metal composition for preparing carbon nanotube has been already known. The representative metal compositions are disclosed in the followings: P. E. Anderson et al., J. Mater. Res., 14(7) 2912 (1999); R. J. Best, W. W. Russell, J. Am, Chem. Soc., 76, 838; CATAL. REV.-SCI. ENG, 42(4), 481-510 (2000).

The yield of carbon nanotube in the Examples in PCT International Publication, WO/2006/050903 'Catalyst for producing carbon nanotubes by means of the decomposition of gaseous carbon compounds on a heterogeneous catalyst' is quoted for the comparison of synthetic yield of carbon nanotube of present invention.

The preparation of the catalyst composition for preparing carbon nanotube of present invention can be summarized as following steps comprising; i) preparing amorphous silicon nano powder; ii) preparing support material containing amorphous silicon; iii) preparing the complex containing transition metal and support material; iv) obtaining gel compound containing a catalyst composition; v) heating the catalyst composition under inert gas atmosphere; and vi) adjusting the particle size of catalyst composition.

To the stirred solution of magnesium or aluminum alkali salt, amorphous silicon is added and stirred. Then, the complex of amorphous silicon and magnesium or the complex of amorphous silicon and aluminum is obtained. After adding the transition metal salt solution to the support complex solution, the catalyst composition is finally obtained. If the added amount of amorphous silicon powder is in the range of 0.1~20 wt %, preferably 0.1~10 wt % as to the total amount of a catalyst composition, the highest catalytic activity is observed.

According to the conventional precipitation or co-precipitation method, transition metal or support material powder can be obtained from the solution where its corresponding ions exist. As a co-precipitating agent, ammonia, sodium carbonate and ammonium carbonate are used. The degree of complexity between transition metal and amorphous silicon is controlled by the precipitation time, temperature and pH. The suitable conditions for complexity are the followings: precipitation time is 10~300 min; the temperature is in the range of room temperature to 60° C.; and pH is in the range of 4~8.

The gel type of precipitating material is concentrated by a filter press method after precipitation of a catalyst composition. The water content of gel type of precipitating material is in the range of 10~50 wt %. To control the water content within 1 wt %, an ordinary drying method can be applied. The drying temperature is in the range of 90~200° C., preferably 90~160° C. The drying time is in the range of 4~100 hours, preferably 5~24 hours.

The obtained dried material is in the form of agglomerate having 1~10 mm of size. The obtained material is crashed and grinded to be 1~100 micrometer of particle size, preferably 1~30 micrometer. Heat treatment to the obtained material can be carried out in the range of 400~800° C., preferably 400~600° C. under inert gas atmosphere to remove the remaining water or ammonium compound.

The obtained catalyst composition containing amorphous silicon is used as a catalyst for preparing carbon nanotube. For the synthesis of carbon nanotube, hydrocarbon is decomposed at high temperature. The examples of hydrocarbon are methane, ethylene, acetylene and butane (Catal. Rev.-Sci. Eng., 42(4), 481-510 (2000)). A continuous-type of a rotary reactor is used for preparing carbon nanotube with the continuous addition of a catalyst composition.

However, the type of reactor is not limited to a rotary type. A fluidized bed type or a gas stream type reactor can be also applied. According to a catalyst composition of present invention, carbon nanotube is prepared in a high yield even without using hydrogen gas as a reducing agent. Therefore, in the presence of the catalyst composition of present invention, the use of explosive gas can be avoid, which results in the reduction of manufacturing cost as well as equipment investing cost.

The obtained carbon nanotube is analyzed by use of FE-SEM and FE-TEM. The number of walls, the diameter of nanotube and the length of nanotube are measured. In order to measure electrical conductivity of carbon nanotube, 1 phr of carbon nanotube is mixed with MPPO polymer resin. After melting the mixture, test samples are obtained. The apparent density of carbon nanotube is in the range of 0.03~0.08 g/cm$^3$ which is measured according to ASTM D 1895.

The present invention can be explained more concretely by following Examples and Comparative Examples. However, the scope of the present invention shall not be limited by following Examples.

EXAMPLES

Example 1

Preparation of Carbon Nanotube 0.25 g of amorphous silicon fine powder, 147.6 g of iron nitrate (Fe(NO$_3$)$_2$.9H$_2$O), 281.1 g of aluminum nitrate (Al(NO$_3$)$_3$.9H$_2$O) and 106.6 g of magnesium nitrate (Mg(NO$_3$)$_2$.6H$_2$O) are mixed and dissolved in 2000 ml of distilled water. 240.6 g of ammonium bicarbonate (NH$_4$HCO$_3$) is added and stirred in the mixture for 1 hour with a magnetic stirrer. Then, the suspension is obtained. The water layer is removed using a funnel filter. The obtained solid material is dried in a vacuum oven at 100° C. for 24 hours. 142 g of dried solid material is obtained and crashed. The average particle size is 32 μm. Heat treatment of dried solid material is further performed at 600° C. for 4 hours under inert gas atmosphere.

The size controlled catalyst powder is continuously added to the reactor at a rate of 1 g/min. The amount of ethylene gas fed into a reactor is 30 L/min and the reaction temperature is 680° C. The reaction is continuously performed for 2 hours.

The catalytic yield of carbon nanotube is 2,400%, and the average diameter is 8 nm which is observed through the FE-SEM. The number of walls is 6. The shape of obtained carbon nanotube shows typical multi-walled carbon nanotube. The apparent density of the obtained carbon nanotube is 0.058 g/cm$^3$ which is measured according to ASTM D 1895. The carbon conversion yield is 74.7%. In order to measure the electrical conductivity, the test sample is prepared by compounding MPPO polymer with 1 phr of carbon nanotube. Following is the preparation method of the test sample. The result is shown in Table 1.

(Measurement of Electrical Conductivity of Test Sample)

0.5 g of prepared carbon nanotube and 50 g of modified polyphenylene oxide (MPPO) are mixed for 1 minute in a vinyl vessel. Then, the mixture is melted using a Hakke mixer. The processing temperature is 260° C. and the rotation speed of screw is 50 rpm and the processing time is 10 minutes. The melted mixture of carbon nanotube/MPPO is pressed to afford a test sample having a dimension of 10 cm×10 cm×5 mm, which is prepared under the pressure of 3500 kgf/cm$^2$ at 260° C. for 10 minutes.

The surface resistance of the prepared test sample is measured by Ohmmeter (Model: OHM-STAT RT-1000, Static Solutions, Inc., U.S.A.) using a two-electrode method.

(Measurement of Catalytic Yield)

{(The amount of obtained carbon nanotube−The amount of added catalyst)/The amount of added catalyst}×100

(Measurement of the Carbon Conversion Yield)

{The amount of obtained carbon nanotube (g)−The amount of added catalyst (g)}/{The amount of added ethylene gas (mole)×24 (g/mol)}×100

Example 2

Preparation of Carbon Nanotube

The catalyst composition is prepared according to the method disclosed in Example 1 except that the amount of amorphous silicon is changed. Carbon nanotube is prepared using the same manner as shown in Example 1. Following is a detailed method.

0.5 g of amorphous silicon fine powder, 147.6 g of iron nitrate (Fe(NO$_3$)$_2$.9H$_2$O), 278.6 g of aluminum nitrate (Al(NO$_3$)$_3$.9H$_2$O) and 105.7 g of magnesium nitrate (Mg(NO$_3$)$_2$.6H$_2$O) are mixed and dissolved in 2000 ml of distilled water. 240.6 g of ammonium bicarbonate (NH$_4$HCO$_3$) is added and stirred in the mixture for 1 hour with a magnetic stirrer. Then, the suspension is obtained. The water layer is removed using a funnel filter. The obtained solid material is dried in a vacuum oven at 100° C. for 24 hours. 100 g of dried solid material is obtained and crashed. The average particle size is 32 μm. Heat treatment of dried solid material is further performed at 600° C. for 4 hours under inert gas atmosphere.

The size controlled catalyst powder is continuously added to the reactor at a rate of 1 g/min. The amount of ethylene gas fed into a reactor is 30 L/min and the reaction temperature is 680° C. The reaction is continuously performed for 2 hours.

The catalytic yield of carbon nanotube is 2,380%, and the average diameter is 10 nm which is observed through the FE-SEM observation. The number of walls is 9. The shape of obtained carbon nanotube shows typical multi-walled carbon nanotube. The apparent density of obtained carbon nanotube is 0.059 g/cm$^3$ which is measured according to ASTM D 1895. The carbon conversion yield is 74.0%. In order to measure the electrical conductivity, the test sample is prepared by compounding MPPO polymer with 1 phr of carbon nanotube. The result is shown in Table 1.

Example 3

Preparation of Carbon Nanotube

The catalyst composition is prepared according to the method disclosed in Example 1 except that the amount of amorphous silicon is changed. Carbon nanotube is prepared using the same manner as shown in Example 1. Following is a detailed method.

1.0 g of amorphous silicon fine powder, 147.6 g of iron nitrate (Fe(NO$_3$)$_2$.9H$_2$O), 274.1 g of aluminum nitrate (Al(NO$_3$)$_3$.9H$_2$O) and 103.9 g of magnesium nitrate (Mg(NO$_3$)$_2$.6H$_2$O) are mixed and dissolved in 20000 of distilled water. 240.6 g of ammonium bicarbonate (NH$_4$HCO$_3$) is added and stirred in the mixture for 1 hour with a magnetic stirrer. Then, the suspension is obtained. The water layer is removed using a funnel filter. The obtained solid material is dried in a vacuum oven at 100° C. for 24 hours. 100 g of dried solid material is obtained and crashed. The average particle size is 32 μm. Heat treatment of dried solid material is further performed at 600° C. for 4 hours under inert gas atmosphere.

The size controlled catalyst powder is continuously added to the reactor at a rate of 1 g/min. The amount of ethylene gas fed into a reactor is 30 L/min and the reaction temperature is 680° C. The reaction is continuously performed for 2 hours.

The catalytic yield of carbon nanotube is 2,310%, and the average diameter is 13 nm which is observed through the FE-SEM observation. The number of walls is 10. The shape of obtained carbon nanotube shows typical multi-walled carbon nanotube. The apparent density of obtained carbon nanotube is 0.060 g/cm$^3$ which is measured according to ASTM D 1895. The carbon conversion yield is 71.9%. In order to measure the electrical conductivity, the test sample is prepared by compounding MPPO polymer with 1 phr of carbon nanotube. The result is shown in Table 1.

Example 4

Preparation of Carbon Nanotube

The catalyst composition is prepared according to the method disclosed in Example 1 except that the amount of amorphous silicon is changed. Carbon nanotube is prepared using the same manner as shown in Example 1. Following is a detailed method.

2.5 g of amorphous silicon fine powder, 147.6 g of iron nitrate (Fe(NO$_3$)$_2$.9H$_2$O), 259.7 g of aluminum nitrate (Al(NO$_3$)$_3$.9H$_2$O) and 98.6 g of magnesium nitrate (Mg(NO$_3$)$_2$.6H$_2$O) are mixed and dissolved in 2000 ml of distilled water. 240.6 g of ammonium bicarbonate (NH$_4$HCO$_3$) is added and stirred in the mixture for 1 hour with a magnetic stirrer. Then, the suspension is obtained. The water layer is removed using a funnel filter. The obtained solid material is dried in a vacuum oven at 100° C. for 24 hours. 100 g of dried solid material is obtained and crashed. The average particle size is 32 μm. Heat treatment of dried solid material is further performed at 600° C. for 4 hours under inert gas atmosphere.

The size controlled catalyst powder is continuously added to the reactor at a rate of 1 g/min. The amount of ethylene gas fed into a reactor is 30 L/min and the reaction temperature is 680° C. The reaction is continuously performed for 2 hours.

The catalytic yield of carbon nanotube is 2,100%, and the average diameter is 15 nm which is observed through the FE-SEM observation. The number of walls is 12. The shape of obtained carbon nanotube shows typical multi-walled carbon nanotube. The apparent density of obtained carbon nanotube is 0.065 g/cm$^3$ which is measured according to ASTM D 1895. The carbon conversion yield is 65.3%. In order to measure the electrical conductivity, the test sample is prepared by compounding MPPO polymer with 1 phr of carbon nanotube. The result is shown in Table 1.

Example 5

Preparation of Carbon Nanotube

The catalyst composition is prepared according to the method disclosed in Example 1 except that the amount of amorphous silicon is changed. Carbon nanotube is prepared using the same manner as shown in Example 1. Following is a detailed method.

5.0 g of amorphous silicon fine powder, 147.6 g of iron nitrate (Fe(NO$_3$)$_2$.9H$_2$O), 236.1 g of aluminum nitrate (Al(NO$_3$)$_3$.9H$_2$O) and 89.7 g of magnesium nitrate (Mg(NO$_3$)$_2$.6H$_2$O) are mixed and dissolved in 2000 ml of distilled water. 240.6 g of ammonium bicarbonate (NH$_4$HCO$_3$) is added and stirred in the mixture for 1 hour with a magnetic stirrer. Then, the suspension is obtained. The water layer is removed using a funnel filter. The obtained solid material is dried in a vacuum oven at 100° C. for 24 hours. 100 g of dried solid material is obtained and crashed. The average particle size is 32 μm. Heat treatment of dried solid material is further performed at 600° C. for 4 hours under inert gas atmosphere.

The size controlled catalyst composition powder is continuously added to the reactor at a rate of 1 g/min. The amount of ethylene gas fed into a reactor is 30 L/min and the reaction temperature is 680° C. The reaction is continuously performed for 2 hours.

The catalytic yield of carbon nanotube is 1,950%, and the average diameter is 18 nm which is observed through the FE-SEM observation. The number of walls is 13. The shape of obtained carbon nanotube shows typical multi-walled carbon nanotube. The apparent density of obtained carbon nanotube is 0.067 g/cm$^3$ which is measured according to ASTM D 1895. The carbon conversion yield is 60.7%. In order to measure the electrical conductivity, the test sample is prepared by compounding MPPO polymer with 1 phr of carbon nanotube. The result is shown in Table 1.

Example 6

Preparation of Carbon Nanotube

The catalyst composition is prepared according to the method disclosed in Example 3 except that the amount of Al and Mg is changed. Carbon nanotube is prepared using the same manner as shown in Example 3. Following is a detailed method.

1.0 g of amorphous silicon fine powder, 110.7 g of iron nitrate (Fe(NO$_3$)$_2$.9H$_2$O), 25.5 g of nickel nitrate (Ni(NO$_3$)$_2$.6H$_2$O), 274.1 g of aluminum nitrate (Al(NO$_3$)$_3$.9H$_2$O) and 103.9 g of magnesium nitrate (Mg(NO$_3$)$_2$.6H$_2$O) are mixed and dissolved in 2000 ml of distilled water. 240.6 g of ammonium bicarbonate (NH$_4$HCO$_3$) is added and stirred in the mixture for 1 hour with a magnetic stirrer. Then, the suspension is obtained. The water layer is removed using a funnel filter. The obtained solid material is dried in a vacuum oven at 100° C. for 24 hours. 100 g of dried solid material is obtained and crashed. The average particle size is 32 μm. Heat treatment of dried solid material is further performed at 600° C. for 4 hours under inert gas atmosphere.

The size controlled catalyst composition powder is continuously added to the reactor at a rate of 1 g/min. The amount of ethylene gas fed into a reactor is 30 L/min and the reaction temperature is 680° C. The reaction is continuously performed for 2 hours.

The catalytic yield of carbon nanotube is 2,200%, and the average diameter is 17 nm which is observed through the FE-SEM observation. The number of walls is 14. The shape of obtained carbon nanotube shows typical multi-walled carbon nanotube. The apparent density of obtained carbon nanotube is 0.069 g/cm$^3$ which is measured according to ASTM D 1895. The carbon conversion yield is 69.2%. In order to measure the electrical conductivity, the test sample is prepared by compounding MPPO polymer with 1 phr of carbon nanotube. The result is shown in Table 1.

Example 7

Preparation of Carbon Nanotube

The catalyst composition is prepared according to the method disclosed in Example 3 except that the amount of Al and Mg is changed. Carbon nanotube is prepared using the same manner as shown in Example 3. Following is a detailed method.

1.0 g of amorphous silicon fine powder, 110.7 g of iron nitrate ($Fe(NO_3)_2.9H_2O$), 24.9 g of cobalt nitrate ($Co(NO_3)_2.6H_2O$), 274.1 g of aluminum nitrate ($Al(NO_3)_3.9H_2O$) and 103.9 g of magnesium nitrate ($Mg(NO_3)_2.6H_2O$) are mixed and dissolved in 2000 ml of distilled water. 240.6 g of ammonium bicarbonate ($NH_4HCO_3$) is added and stirred in the mixture for 1 hour with a magnetic stirrer. Then, the suspension is obtained. The water layer is removed using a funnel filter. The obtained solid material is dried in a vacuum oven at 100° C. for 24 hours. 100 g of dried solid material is obtained and crashed. The average particle size is 32 μm. Heat treatment of dried solid material is further performed at 600° C. for 4 hours under inert gas atmosphere.

The size controlled catalyst composition powder is continuously added to the reactor at a rate of 1 g/min. The amount of ethylene gas fed into a reactor is 30 L/min and the reaction temperature is 680° C. The reaction is continuously performed for 2 hours.

The catalytic yield of carbon nanotube is 2,180%, and the average diameter is 16 nm which is observed through the FE-SEM observation. The number of walls is 13. The shape of obtained carbon nanotube shows typical multi-walled carbon nanotube. The apparent density of obtained carbon nanotube is 0.065 g/cm$^3$ which is measured according to ASTM D 1895. The carbon conversion yield is 70.4%. In order to measure the electrical conductivity, the test sample is prepared by compounding MPPO polymer with 1 phr of carbon nanotube. The result is shown in Table 1.

Comparative Example 1

Preparation of Carbon Nanotube Using the Catalyst Composition Containing Crystalline Silicon 1.0 g of crystalline silicon fine powder, 147.6 g of iron nitrate ($Fe(NO_3)_2.9H_2O$), 274.1 g of aluminum nitrate ($Al(NO_3)_3.9H_2O$) and 104.1 g of magnesium nitrate ($Mg(NO_3)_2.6H_2O$) are mixed and dissolved in 2000 ml of distilled water. 240.6 g of ammonium bicarbonate ($NH_4HCO_3$) is added and stirred in the mixture for 1 hour with a magnetic stirrer. Then, the suspension is obtained. The water layer is removed using a funnel filter. The obtained solid material is dried in a vacuum oven at 100° C. for 24 hours. 100 g of dried solid material is obtained and crashed. The average particle size is 32 μm. Heat treatment of dried solid material is further performed at 600° C. for 4 hours under inert gas atmosphere.

The size controlled catalyst composition powder is continuously added to the reactor at a rate of 1 g/min. The amount of ethylene gas fed into a reactor is 30 L/min and the reaction temperature is 680° C. The reaction is continuously performed for 2 hours.

The catalytic yield of carbon nanotube is 1,080%, and the average diameter is 21 nm which is observed through the FE-SEM observation. The number of walls is 20. The shape of obtained carbon nanotube shows typical multi-walled carbon nanotube. The apparent density of obtained carbon nanotube is 0.095 g/cm$^3$ of which is measured according to ASTM D 1895. The carbon conversion yield is 33.6%. In order to measure the electrical conductivity, the test sample is prepared by compounding MPPO polymer with 1 phr of carbon nanotube. The result is shown in Table 1.

Comparative Example 2

Preparation of Carbon Nanotube Using the Catalyst Composition without Amorphous Silicon 147.6 g of iron nitrate ($Fe(NO_3)_2.9H_2O$), 283.6 g of aluminum nitrate ($Al(NO_3)_3.9H_2O$) and 107.6 g of magnesium nitrate ($Mg(NO_3)_2.6H_2O$) are mixed and dissolved in 2000 ml of distilled water. 240.6 g of ammonium bicarbonate ($NH_4HCO_3$) is added and stirred in the mixture for 1 hour with a magnetic stirrer. Then, the suspension is obtained. The water layer is removed using a funnel filter. The obtained solid material is dried in a vacuum oven at 100° C. for 24 hours. 100 g of dried solid material is obtained and crashed. The average particle size is 32 μm. Heat treatment of dried solid material is further performed at 600° C. for 4 hours under inert gas atmosphere.

The size controlled catalyst composition powder is continuously added to the reactor at a rate of 1 g/min. The amount of ethylene gas fed into a reactor is 30 L/min and the reaction temperature is 680° C. The reaction is continuously performed for 2 hours.

The catalytic yield of carbon nanotube is 1,120%, and the average diameter is 25 nm which is observed through the FE-SEM observation. The number of walls is 23. The shape of obtained carbon nanotube shows typical multi-walled carbon nanotube. The apparent density of obtained carbon nanotube is 0.089 g/cm$^3$ which is measured according to ASTM D 1895. The carbon conversion yield is 34.8%. In order to measure the electrical conductivity, the test sample is prepared by compounding MPPO polymer with 1 phr of carbon nanotube. The result is shown in Table 1.

Comparative Example 3

Preparation of Carbon Nanotube Using the Catalyst Composition Disclosed in WO2006/50903

Carbon nanotube is prepared using the catalyst composition disclosed in PCT International publication No. WO 2006/50903 'Catalyst for producing carbon nanotubes by means of the decomposition of gaseous carbon compounds on a heterogeneous catalyst'.

99.8 g of cobalt nitrate $(Co(NO_3)_2.6H_2O)$, 74.6 g of manganese nitrate $(Mn(NO_3)_2.6H_2O)$, 209.8 g of magnesium nitrate $(Mg(NO_3)_2.6H_2O)$ are mixed and dissolved in 2000 ml of distilled water. 240.6 g of ammonium bicarbonate $(NH_4HCO_3)$ is added and stirred in the mixture for 1 hour with a magnetic stirrer. Then, the suspension is obtained. The water layer is removed using a funnel filter. The obtained solid material is dried in a vacuum oven at 100° C. for 24 hours. 100 g of dried solid material is obtained and crashed. The average particle size is 32 μm. Heat treatment of dried solid material is further performed at 600° C. for 4 hours under inert gas atmosphere.

The size controlled catalyst composition powder is continuously added to the reactor at a rate of 1 g/min. The amount of ethylene gas fed into a reactor is 30 L/min and the reaction temperature is 680° C. The reaction is continuously performed for 2 hours.

The catalytic yield of carbon nanotube is 2,040%, and the average diameter is 24 nm which is observed through the FE-SEM observation. The number of walls is 22. The shape of obtained carbon nanotube shows typical multi-walled carbon nanotube. The apparent density of obtained carbon nanotube is 0.072 g/cm³ which is measured according to ASTM D 1895. The carbon conversion yield is 63.4%. In order to measure the electrical conductivity, the test sample is prepared by compounding MPPO polymer with 1 phr of carbon nanotube. The result is shown in Table 1.

Table 1 shows the physical properties, structure and catalytic yield of carbon nanotube prepared in Examples and Comparative Examples.

TABLE 1

| Example and Comparative Example | Diameter (nm) | number of walls | Catalytic yield (%) | Carbon conversion yield (%) | Surface resistance (ohm/sq) |
|---|---|---|---|---|---|
| Example 1 | 8 | 6 | 2,400 | 74.7 | $10^{4.0}$ |
| Example 2 | 10 | 9 | 2,380 | 74.0 | $10^{3.9}$ |
| Example 3 | 13 | 10 | 2,310 | 71.9 | $10^{4.0}$ |
| Example 4 | 15 | 12 | 2,100 | 65.3 | $10^{4.2}$ |
| Example 5 | 18 | 13 | 1,950 | 60.7 | $10^{4.5}$ |
| Example 6 | 17 | 14 | 2,200 | 69.2 | $10^{4.3}$ |
| Example 7 | 16 | 13 | 2,180 | 70.4 | $10^{4.1}$ |
| Comparative Example 1 | 21 | 20 | 1,080 | 33.6 | $10^{6.4}$ |
| Comparative Example 2 | 25 | 23 | 1,120 | 34.8 | $10^{5.2}$ |
| Comparative Example 3 | 24 | 22 | 2,040 | 63.4 | $10^{12}$ |

What is claimed is:

1. A catalyst composition containing amorphous silicon support material for preparing carbon nanotube represented by following formula

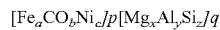

$[Fe_aCO_bNi_c]p[Mg_xAl_ySi_z]q$ wherein

[Fe, Co, Ni] represents catalytic metal of iron, cobalt, nickel and its oxide or its derivative;

[Mg, Al, Si] represents inactive support material of magnesium, aluminum, amorphous silicon and its oxide or its derivative;

p and q represent mole fraction of catalytic metal and inactive support material, respectively;

$p+q=1$, $0.03 \leqq p \leqq 0.9$, $0.1 \leqq q \leqq 0.97$, a, b and c represent mole fraction of Fe, Co and Ni, respectively;

$a+b+c=1$, $0.1 \leqq a \leqq 1.0$, $0 \leqq b \leqq 0.9$, $0 \leqq c \leqq 0.9$, x, y and z represent mole fraction of Mg, Al and amorphous Si, respectively;

$x+y+z=1$, $0.05 \leqq x \leqq 0.95$, $0.05 \leqq y \leqq 0.95$, $0.005 \leqq z \leqq 0.6$.

2. The catalyst composition according to claim 1, wherein p and q represent mole fraction of catalytic metal and inactive support material, respectively;

$p+q=1$, $0.1 \leqq p \leqq 0.7$, $0.3 \leqq q \leqq 0.9$, a, b and c represent mole fraction of Fe, Co and Ni, respectively;

$a+b+c=1$, $0.2 \leqq a \leqq 0.95$, $0.01 \leqq b \leqq 0.8$, $0.01 \leqq c \leqq 0.8$, x, y and z represent mole fraction of Mg, Al and amorphous Si, respectively;

$x+y+z=1$, $0.1 \leqq x \leqq 0.9$, $0.1 \leqq y \leqq 0.9$, $0.005 \leqq z \leqq 0.5$.

3. The catalyst composition according to claim 1, wherein the particle size of amorphous silicon is 50~500 nm.

4. A process for preparing the catalyst composition containing amorphous silicon support material for carbon nanotube of claim 1 comprising;

i) preparing the amorphous silicon nano powder;

ii) preparing the support material Si, Mg and Al solution by mixing Mg and Al salt solution with amorphous silicon nano powder;

iii) preparing the aqueous solution containing catalytic metal and support material of $\{[Fe_aCO_bNi_c]p[Mg_xAl_ySi_z]q\}$ by adding catalytic metal solution to the support material solution prepared in step (ii);

iv) co-precipitating or coordinated precipitating the catalyst composition containing the catalytic metal and support material by adding co-precipitating agent solution to the aqueous solution prepared in step (iii);

v) filtering, drying and milling the co-precipitated catalyst composition obtained in step (iv);

vi) heat treating the catalyst composition obtained in step (v) at 400~800° C. under inert gas atmosphere; and vii) grinding the heat treated catalyst composition prepared in step (vi) in dry condition.

5. The process according to claim 4, wherein the co-precipitated agent solution is ammonium bicarbonate solution.

* * * * *